(12) United States Patent
Pham et al.

(10) Patent No.: US 11,926,754 B2
(45) Date of Patent: Mar. 12, 2024

(54) FLUOROPOLYMER COATING COMPOSITION

(71) Applicants: THE CHEMOURS COMPANY FC, LLC, Wilmington, DE (US); CHEMOURS-MITSUI FLUOROPRODUCTS CO., LTD., Tokyo (JP)

(72) Inventors: Hoai-Nam Pham, Shizuoka (JP); Daisaku Shinohara, Shizuoka (JP); Takumi Terao, Shizuoka (JP); Akihiro Matsui, Shizuoka (JP)

(73) Assignees: THE CHEMOURS COMPANY FC, LLC, Wilmington, DE (US); CHEMOURS-MITSUI FLUOROPRODUCTS CO., LTD., Tokyo (JP)

( * ) Notice: Subject to any disclaimer, the term of this patent is extended or adjusted under 35 U.S.C. 154(b) by 468 days.

(21) Appl. No.: 17/058,028

(22) PCT Filed: May 20, 2019

(86) PCT No.: PCT/US2019/033109
§ 371 (c)(1),
(2) Date: Nov. 23, 2020

(87) PCT Pub. No.: WO2019/226543
PCT Pub. Date: Nov. 28, 2019

(65) Prior Publication Data
US 2021/0324221 A1    Oct. 21, 2021

(30) Foreign Application Priority Data
May 24, 2018    (JP) .................................. 2018-099722

(51) Int. Cl.
*C09D 127/18* (2006.01)
*C08G 65/00* (2006.01)
*C08L 83/04* (2006.01)
*C09D 7/40* (2018.01)

(52) U.S. Cl.
CPC .......... *C09D 127/18* (2013.01); *C08G 65/007* (2013.01); *C08L 83/04* (2013.01); *C09D 7/40* (2018.01); *C08L 2205/18* (2013.01); *C08L 2205/22* (2013.01)

(58) Field of Classification Search
CPC ........ C09D 127/18; C09D 5/033; C09D 7/40; C08L 83/04; C08L 2205/18; C08L 2205/22; B29C 33/62; C08G 65/007
See application file for complete search history.

(56) References Cited

U.S. PATENT DOCUMENTS

| 2003/0114058 A1* | 6/2003 | Ishii | C08L 25/06 442/99 |
|---|---|---|---|
| 2018/0155569 A1* | 6/2018 | Pham | C09D 5/031 |

FOREIGN PATENT DOCUMENTS

| CN | 107216727 A | 9/2017 | |
|---|---|---|---|
| EP | 075671 A1 | 4/1996 | |
| EP | 1134276 A1 * | 9/2001 | ............ B29C 33/62 |
| JP | 2658172 B2 | 9/1997 | |
| JP | 2002516618 A | 6/2002 | |
| JP | 2004074646 A | 3/2004 | |
| JP | 3505719 B2 | 9/2004 | |
| JP | 4116763 B2 | 7/2008 | |
| JP | 2011063709 A | 3/2011 | |
| WO | 2018-102494 A1 | 6/2018 | |

* cited by examiner

Primary Examiner — K. Boyle

(57) ABSTRACT

Provided is a coating film having excellent durability and wear resistance, and utility as mold surface release coating. The coating film has excellent releasability (non-adhesiveness) over a long period of time. Further provided is a coating composition capable of forming such a coating film, the coating composition containing a fluoropolymer and an oil that is a liquid at 25° C., wherein the decomposition temperature of the oil is higher than the melting point of the fluoropolymer.

11 Claims, No Drawings

FLUOROPOLYMER COATING COMPOSITION

CROSS-REFERENCE TO RELATED APPLICATIONS

This application represents a national filing under 35 U.S.C. 371 of International Application No. PCT/US2019/033109 filed May 20, 2019, and claims priority of Japanese Patent Application No. 2018-099722 filed May 24, 2018.

BACKGROUND INFORMATION

Field of the Disclosure

The present invention relates to a fluoropolymer coating composition of utility as a coating film having excellent durability and wear resistance and capable of sustaining non-adhesiveness and releasability for a long period of time.

Description of the Related Art

Fluoropolymers have excellent heat resistance, chemical resistance, electrical properties, and mechanical properties, and have very low coefficient of friction as well as non-adhesiveness and water and oil repellency. Therefore, they are used in a wide variety of industrial fields such as the chemical, machinery, and electrical machinery industries. Since melt-processable fluoropolymers demonstrate melt flow at a temperature equal to or higher than their melting point, the generation of pin holes can be suppressed when such fluoropolymers are formed into a coating, and thus the fluoropolymers are used in coating compositions for forming fluoropolymer coatings.

Fluoropolymer coatings utilizing the non-adhesiveness and water and oil repellency of fluoropolymers are also used in cookware such as frying pans, and rice cookers, heat resistant releasable trays (in bread making processes and the like) in production lines, office automation (OA) equipment such as fixing rolls/belts for fixing toners, and other various fields. Use of fluoropolymer coatings is also found in other fields, such as inkjet nozzles and chemical plant equipment. As such here is a continued demand for coatings with enhanced and more durable non-adhesiveness and water and oil repellency.

For example, the below-described Patent Document 1 discloses, as a coating agent for imparting waterproofing effects to the surfaces of porous civil engineering building materials such as concrete, an aqueous dispersion composition made from a repellent selected from a compound having a perfluoroalkyl group, a fluoro oil, a fluorosilicone oil, and the like; an organic silicon compound; and a polymer containing fluorine. Furthermore, the below-mentioned Patent Document 2 discloses, as an automobile finish, a coating composition formed by mixing an aqueous dispersion of polytetrafluoroethylene with an aqueous dispersion of perfluoropolyether.

To enhance releasability when plastic, rubber or other such polymer material, ceramic, cement, and the like are molded using a mold, it is well known that, by utilizing the above-described non-adhesiveness possessed by fluoropolymers, a fluoropolymer coating can be formed on the mold surface (Patent Documents 3 and 4, and the like), or a releasing agent made from a fluorine compound can be applied to a mold surface (Patent Documents 5 and 6, and the like).

PATENT LITERATURE

Patent Document 1: JP 3505719 B
Patent Document 2: JP 4116763 B
Patent Document 3: JP 2002-516618 T
Patent Document 4: JP 2004-74646 A
Patent Document 5: JP 2658172 A
Patent Document 6: JP 2011-63709 A

SUMMARY

Technical Problem

However, known fluoropolymer coatings used for mold release on mold surfaces have a problem in that the coatings experience a decrease in releasability upon repeated use of the mold surface for molding, and are thus not fully satisfactory in terms of durability. Further, mold release agents need to be re-applied each molding cycle, or at least every few molding cycles, and are thus not fully satisfactory in terms of productivity.

To solve problems such as these, the inventors of the present invention proposed a fluoropolymer coating composition obtained by blending a fluoropolymer, and a fluoro oil having a decomposition temperature which is higher than the melting point of the fluoropolymer (see JP 2016-234033). With the fluoropolymer coating composition thereof, a coating film capable of maintaining excellent releasability over a long period of time can be formed, but since fluoro oil is expensive, there is industry need for a fluoropolymer coating composition capable of manifesting the same action and effect without the use of such fluoro oils.

Accordingly, an object of the present invention is to provide a coating film having excellent durability and wear resistance that, when applied to a mold surface, is capable of expressing excellent releasability (non-adhesiveness) over a long period of time, and a coating composition capable of forming such a coating film.

Solution to the Problem

The present invention provides a fluoropolymer coating composition containing a fluoropolymer and an oil that is a liquid at 25° C., wherein the decomposition temperature of the oil is higher than the melting point of the fluoropolymer.

The fluoropolymer coating composition according to the present invention has a variety of embodiments, including:
1. in one embodiment the oil is contained at an amount from 1 to 35 wt. % per the total amount of a polymer solids content and the oil in the coating composition,
2. in one embodiment the decomposition temperature of the oil is at least 10° C. higher than the melting point of the fluoropolymer,
3. in one embodiment the oil is a silicone oil,
4. in one embodiment the oil is dispersed in the coating composition,
5. in one embodiment the oil is dispersed in the coating composition with an average particle diameter of 50 μm or less,
6. in one embodiment the coating composition contains a surfactant,
7. in one embodiment the fluoropolymer is a melt-processable perfluoropolymer,
8. in one embodiment the coating composition is in the form of a water-based coating or a powder coating, and
9. in one embodiment the composition is in the form of a top coating.

According to the present invention, a method for forming a coating film is provided, the method including applying the aforementioned fluoropolymer coating composition, and then heat treating the coated composition to a temperature of at least the melting point of the fluoropolymer.

Additionally, according to the present invention, provided is a coating film made from the aforementioned fluoropolymer coating composition in which the oil is dispersed.

Furthermore, according to the present invention, provided is a mold having a coating film formed from the aforementioned fluoropolymer coating composition on the molding surface thereof.

Advantageous Effects of the Invention

With the coating composition of the present invention, a coating film can be formed which exhibits excellent releasability (non-adhesiveness) similar in performance to coating films incorporating fluoro oil. The present coating films excel in wear resistance and durability, and exhibit, over a long period of time, releasability (non-adhesiveness) superior to that of known releasing agents or release coating compositions. In a preferred embodiment of the coating composition of the present invention, the oil used is a silicone oil that is a liquid at ordinary temperature (25° C.) and has a decomposition temperature at or above the melting point of the fluoropolymer.

Furthermore, molds with molding surfaces coated with coating film made from the coating composition according to the present invention excel in releasability of molded articles, and thus also excels in formability. Furthermore, the mold can sustain the releasability over a long period of time, resulting in excellent productivity.

In one embodiment where the present oil is silicone oil, the coating composition of the present invention can be safely used in cookware such as frying pans.

DESCRIPTION OF EMBODIMENTS

Coating Composition

In one embodiment of the present invention, the coating composition is a fluoropolymer coating composition containing a fluoropolymer and an oil that is a liquid at 25° C. (herein alternately referred to as "oil"), and an important characteristic of the coating composition is that the decomposition temperature of the oil is higher than the melting point of the fluoropolymer.

In one embodiment of the present invention, oil that is in a liquid state at standard temperature is blended together with fluoropolymer excelling in non-adhesiveness and water and oil repellency and the resultant coating composition is used to make a coating film, wherein the oil is exuded to the coating film surface, thereby making it possible to further enhance the non-adhesiveness of the fluoropolymer in the form of a coating film.

The oil used in embodiments of the present invention has a decomposition temperature that is higher than the melting point of the fluoropolymer. Thus, even when heat treated at a temperature around the melting point of the fluoropolymer, the oil will not decompose and volatilize into a gas. As a result, not only will the above-described non-adhesiveness effect due to the oil not be impaired, but the generation of coating film defects, such as the occurrence of bubbles caused by the volatilization of the oil, will be effectively prevented.

Furthermore, as will be described later herein, in an embodiment of the present invention, since the oil is present in a dispersed state in the coating composition, the oil is also present in a dispersed state inside a coating film formed from the coating composition. Therefore, even when the coating film is worn due to use, the oil contained in the coating film gradually exudes to the film wear surface, thus making it possible for the present coating film to exhibit a high level of non-adhesiveness over a long period of time.

To effectively achieve the above-described effect that is obtainable because the oil is present in a dispersed state in the coating film, in one embodiment the average particle diameter of oil particles dispersed in the coating composition is 50 μm or less, preferably 20 μm or less, and particularly preferably 10 μm or less. The method for measuring the average particle diameter will be described later herein.

In an embodiment of the present invention, as was described above, it is important that the decomposition temperature of the oil be higher than the melting point of the fluoropolymer. In some embodiments, the oil decomposition temperature is at least 10° C. higher, preferably at least 30° C. higher, and more preferably at least 50° C. higher than the melting point of the fluoropolymer. As a result, possibly undesirable effects due to the oil during heat treatment to form the coating film can be reliably reduced, thus ensuring further enhancement of the non-adhesiveness of the coating film by the oil.

The melting point of the present fluoropolymer is the temperature corresponding to a melting peak measured using a Differential Scanning calorimeter (DSC) according to the method of ASTM D3307. The decomposition temperature of the oil is the temperature derived by calculating the results of a thermal gravimetric measurement (TGA) according to the method disclosed in JIS K7120. Detailed measuring methods will be described later in the present Examples.

Furthermore, by including oil in the present coating compositions, wear is reduced by the oil that is exuded to the coating film surface, the friction coefficient of the coating film is reduced (slipperiness is improved), and the wear resistance of the coating film is also improved. In one embodiment, the addition of a filler to the present coating composition, coupled with the presence of the oil, further enhances wear resistance of the present coating film such that the film can exhibit excellent releasability described earlier over a long period of time. Therefore, forming a present coating film on a mold surface leads to better productivity of a mold having molding surfaces coated with the present coating film.

As long as the coating composition according to an embodiment of the present invention includes a combination of the above-described fluoropolymer and oil, the composition may be in the form of a water-based coating composition, a solvent-based coating composition, or a powder coating composition. Water-based coating compositions or powder coating compositions are preferable from an environmental and cost perspective. Furthermore, powder coating compositions can form very thick coating films.

Fluoropolymer

Examples of fluoropolymers of utility in the coating compositions of the present invention include, but are not limited to, polytetrafluoroethylene (PTFE), tetrafluoroethylene-perfluoro(alkyl vinyl ether) copolymers (PFA), tetrafluoroethylene-hexafluoropropylene copolymers (FEP), tetrafluoroethylene-hexafluoropropylene-perfluoro(alkyl vinyl ether) copolymers, tetrafluoroethylene-ethylene copolymers, polyvinylidene fluorides, polychlorotrifluoroethylenes, and chlorotrifluoroethylene-ethylene copolymers.

In one embodiment, from the perspective of being able to suppress the generation of pin holes and obtain a uniform, smooth coating film when the coating film is formed, a melt-processable fluoropolymer exhibiting melt flow at or above the melting point thereof is preferably used as fluoropolymer. Of the fluoropolymers, from the perspective of non-adhesiveness and heat resistance of the coating film, a melt-processable perfluoropolymer, such as, PFA, FEP, tetrafluoroethylene-hexafluoropropylene-perfluoro(alkyl vinyl ether) copolymer or low molecular weight PTFE (known in this field as PTFE micropowder) are used. PFA is preferred.

The alkyl group of the perfluoro(alkyl vinyl ether) in the PFA has 1 to 5 carbons, and among these, perfluoro(propyl vinyl ether) (PPVE), perfluoro(ethyl vinyl ether) (PEVE), and perfluoro(methyl vinyl ether) (PMVE) are preferred. The amount of perfluoro(alkyl vinyl ether) in the PFA is preferably in a range from 1 to 50 wt. %.

Oil

In one embodiment of the present invention, oil that is a liquid at 25° C. means an oil that exhibits fluidity and is in the liquid phase under standard conditions (temperature 25° C.), and which has a decomposition temperature that is higher than the melting point of the chosen fluoropolymer.

As described above, PFA is most preferably used as the fluoropolymer, and therefore the decomposition temperature of the oil is preferably sufficiently higher than the 300 to 310° C. melting point of PFA, and more specifically, the decomposition temperature of the oil is preferably 350° C. or higher.

Furthermore, an object of one embodiment of the present invention is for the oil to exude to the surface of the fluoropolymer coating film that is formed to further improve the non-adhesiveness of the fluoropolymer coating film. Thus, the surface tension of the oil itself is preferably low, that is, the surface tension at 25° C. is preferably 30 mN/m or less, and is more preferably 20 mN/m or less.

To satisfy these types of conditions, the oil needs to excel in heat resistance and have minimal intermolecular interaction. Examples of oils include silicone oil, modified silicone oil, or alkane oils having from 15 to 100 carbons, higher fatty acid oils having from 5 to 50 carbons, fatty acid ester oils, polyol ester oils, polyglycol oils, polyether oils, polyphenyl ether oils, or other such hydrocarbon-based oils, and these may be used singly, or can be mixed and used.

In one embodiment of the present invention, the present oil is a silicone oil. Example silicone oils include dimethyl silicone oil, methylphenyl silicone oil, methyl hydrogen silicone oil or other such straight silicone oils; monoamine-modified silicone oil, diamine-modified silicone oil, amino-modified silicone oil, epoxy-modified silicone oil, alicyclic epoxy-modified silicone oil, carbinol-modified silicone oil, mercapto-modified silicone oil, carboxyl-modified silicone oil, hydrogen-modified silicone oil, amino polyether-modified silicone oil, epoxy polyether-modified silicone oil, epoxy aralkyl modified silicone oil, and other such reactive modified silicone oils; and polyether-modified silicone oil, aralkyl-modified silicone oil, fluoroalkyl-modified silicone oil, halogen-modified silicone oil, long-chain alkyl-modified silicone oil, higher fatty acid ester-modified silicone oil, higher fatty acid amide-modified silicone oil, polyether-long-chain alkyl-aralkyl-modified silicone oils, long-chain alkyl-aralkyl-modified silicone oils and other such non-reactive-modified silicone oils. Of these methylphenyl silicone oil which can be used even in food product applications is preferably used.

In one embodiment, the present coating composition contains oil in an amount of from 1 to 35 wt. %, preferably from 5 to 20 wt. %, of the total weight of polymer solids content (weight of the fluoropolymer contained in the coating composition) and oil in the coating composition. Where the amount of the oil is less than the above-described range, it may not be possible to significantly enhance the non-adhesiveness of the coating film when compared to cases where the amount is within the above-described range. Where the amount of the oil is greater than the above-described range, coating film defects may occur in comparison to when the amount is within the above-described range.

Furthermore, from the perspective of adequately providing the coating film with the characteristics described above including the heat resistance, chemical resistance, and the like possessed by the fluoropolymer, the content of the fluoropolymer is at least 80 wt. %, and preferably at least 90 wt. %, based on a coating solids content (the total solids content remaining as the coating film excluding the oil) of the coating composition.

In one embodiment of the present invention, the silicone oil and the like described above as oils that are liquid at 25° C. are used, and use of a fluoro oil by itself is excluded. However, auxiliary use of a fluoro oil with an oil that is a liquid at 25° C. and is other than the above-described fluoro oil is not excluded. In the embodiment where an auxiliary fluoro oil is used, the content of fluoro oil is 50 wt. % or less of the total amount of the oil.

In one embodiment the present oil is essentially free from fluorine or fluoro oil. In one embodiment, an oil that is essentially free from fluorine contains less than 1 weight percent of fluorine or fluoro oil. In another embodiment, an oil that is essentially free from fluorine contains no fluorine or fluoro oil. In one embodiment the present oil is a silicone oil that is essentially free from fluorine or fluoro oil. In one embodiment, a silicone oil that is essentially free from fluorine contains less than 1 weight percent of fluorine or fluoro oil. In another embodiment, a silicone oil that is essentially free from fluorine contains no fluorine or fluoro oil.

Examples of the fluoro oil that can be used in combination with the present oils include, but are not limited to perfluoropolyethers (PFPE), perfluoroalkyl polyethers, telomers of fluorinated monomers (for example, tetrafluoroethylenes (TFE), ethylene trifluorides, vinylidene fluorides, chlorotetrafluoroethylenes (CTFE), and fluorinated acrylic monomers), and other specific fluorinated hydrocarbon compounds. As this type of fluoro oil, PFPE having low surface energy and capable of efficiently enhancing the non-adhesiveness of the coating film can be suitably used, and can be obtained as a commercially-available product such as those of the trade names of Krytox® (available from The Chemours Company) or DEMNUM (trade name) (available from Daikin Industries, Ltd.).

Preparation of Coating Composition

As was described above, the coating composition according to an embodiment of the present invention may be any form of water-based or solvent-based coating composition or powder coating composition. From an environmental perspective, the composition is preferably a water-based coating composition or powder coating composition. Examples of methods for preparing the coating composition include, but are not limited to, the methods described below.

When the coating composition according to an embodiment of the present invention is prepared as a water-based coating composition, the composition can be prepared using a method for mixing an oil and other additives to be described later, in an aqueous dispersion of fluoropolymer or a liquid mixture thereof (for example, an existing fluoropolymer water-based coating), or a method for mixing a powder of a fluoropolymer in an oil and an aqueous solvent together with other additives, or the like.

Furthermore, when the coating composition according to an embodiment of the present invention is prepared as a solvent-based coating composition, the composition can be prepared using a method for mixing a powder of a fluoropolymer in an oil and a solvent along with other additives, or a method for adding the oil and other additives to a fluoropolymer solution.

Additionally, when the coating composition according to an embodiment of the present invention is prepared as a powder coating composition, the composition can be prepared using a method for coagulating a fluoropolymer aqueous dispersion and an oil simultaneously to obtain a composite fluoropolymer powder (co-coagulation).

The fluoropolymer aqueous dispersion used in the coating composition according to an embodiment of the present invention can be prepared by dispersing the fluoropolymer uniformly and stably in an aqueous solution using a surfactant, and the like, or by subjecting the fluoropolymer to water-based emulsification and polymerization using a surfactant and an initiator, or a chain transfer agent or the like, as necessary.

In one embodiment, fluoropolymer particles having an average particle diameter of 0.01 to 180 µm are dispersed in the fluoropolymer aqueous dispersion until the content of the particles thereof become 10 to 70 wt. % of the aqueous solution.

Although the fluoropolymer aqueous dispersion can be used as-is in the coating composition according to an embodiment of the present invention, optional fillers and a variety of optional additives can additionally be included in the fluoropolymer aqueous dispersion used according to desired characteristics, such as dispersibility, conductivity, foaming prevention, and improved wear resistance. Example such fillers and additives include: surfactants, examples thereof include polyoxyethylene alkyl ether and polyoxyethylene alkyl phenyl ether type nonionic surfactants such as LIOCOL (trade name) available from LION, Inc., the TRITON (trade name) and TERGITOL (trade name) series available from the Dow Chemical Company, and EMALGEN (trade name) available from KAO, Inc.; sulfosuccinate-, alkyl ether sulfonic acid sodium salt-, and sulfate mono-long chain alkyl based anionic surfactants such as REPAL (trade name) available from LION, Inc., and EMAL (trade name) and PELEX (trade name) available from KAO, Inc.; and polycarboxylate- and acrylic acid salt type polymer surfactants such as LEOAL (trade name) available from LION, Inc., OROTAN (trade name) available from the Dow Chemical Company); film forming agents (examples include polymeric film forming agents such as polyamides, polyamide imides, and acrylics, acetates; higher alcohols and ethers; and polymeric surfactants having a film forming effect); and thickeners (examples include soluble celluloses, solvent dispersion thickeners, sodium alginates, caseins, sodium caseinates, xanthan gums, polyacrylic acids, and acrylic esters).

Aqueous Coating Composition

The water-based coating composition according to an embodiment of the present invention can be prepared by blending the oil with the fluoropolymer aqueous dispersion prepared by the above-described method or an aqueous composition liquid thereof such that the content of the oil is from 1 to 35 wt. % with respect to the total weight of the polymer solids content (weight of the fluoropolymer contained in the coating composition) and the oil in the coating composition, and then mixing and stirring the dispersion or liquid.

Although the oil can be used alone in the coating composition according to an embodiment of the present invention, as was described above, in a further embodiment a surfactant can be used in combination therewith so that the oil can be well dispersed in the composition. Known surfactants can be used to improve the dispersibility of the oil in a present aqueous coating composition.

In an embodiment of the present invention, when a silicone oil is used, the silicone oil can be highly dispersed by using a surfactant that excels in affinity with the silicone oil, and therefore, use of a silicone-based surfactant having a silicone structure as a hydrophobic group is preferable.

Examples of the silicone-based surfactants include polyoxyethylene (POE)-modified organopolysiloxanes, polyoxyethylene-polyoxypropylene (POE-POP)-modified organopolysiloxanes, POE sorbitan-modified organopolysiloxanes, POE glyceryl-modified organopolysiloxanes and other such organopolysiloxanes-modified with a hydrophilic group.

Specific examples include DBE-712 and DBE-821 (available from Azmax), KF-6015, KF-6016, KF-6017 and KF-6028 (available from Shin-Etsu Chemical Co., Ltd.), ABIL-EM97 (available from Goldschmidt), and Polyflow KL-100, Polyflow KL-401, Polyflow KL-402, and Polyflow KL-700 (available from Kyoeisha Chemical Co., Ltd.).

To ensure that the oil is well dispersed, in one embodiment the surfactant is blended at an amount from 1 to 150 parts by weight, and preferably from 5 to 100 parts by weight per 100 parts by weight of the oil.

In addition, when the above-described surfactant is used, the oil can be diluted with the fluoropolymer and other additives and converted to a lower viscosity, and thereby when the fluoropolymer is mixed and stirred, it is possible to obtain a dispersion in which the oil is more finely dispersed.

Examples of a fluorine-based solvent that can be used to dilute the oil include hydrofluorocarbons (HFC), perfluorocarbons (PFC), hydrochlorofluorocarbons (HCFC), chlorofluorocarbons (CFC), hydrofluoroolefins (HFO), hydrochlorofluoroolefins (HCFO), and hydrofluoroethers (HFE).

In one embodiment the solvent is blended at an amount from 100 to 500 parts by weight per 100 parts by weight of the oil.

Furthermore, to ensure that the oil is well dispersed, in one embodiment the oil can be dispersed using ultrasonic dispersion or a dispersion through a high shear rate, in conjunction with the use of the above-described surfactant. A commonly used ultrasonic disperser, stirrer, or a variety of homogenizers (high pressure, high speed, ultrasonic, and the like) can be used for these dispersions. Through the use thereof, the oil can be well dispersed without being diluted with a solvent, which is preferable from the perspective that doing so simplifies the process and lowers costs, especially in the case of fluorinated solvents. Furthermore, the dispersion described above can naturally be done after the oil has been diluted with a solvent, and better dispersion would be expected as a result of doing so.

Solvent-Based Coating Composition

In a solvent-based coating composition embodiment, a fluoropolymer solution or a fluoropolymer and solvent dispersion mixture is prepared, and the oil, or preferably the oil dispersion described above, is added to this mixture such that the amount of oil is from 1 to 35 wt. % of the total weight of the polymer solids content (weight of the fluoropolymer contained in the coating composition) and the oil in the coating composition. Then, the materials are stirred and mixed to prepare a present coating composition.

Powder Coating Composition

In one embodiment a powder coating composition is prepared by adding oil, in a further embodiment in the form of the above-described oil dispersion, to the fluoropolymer aqueous dispersion prepared by the above-described method so that the amount of oil in the coating composition is from 1 to 35 wt. % of the total weight of the polymer solids content (weight of the fluoropolymer contained in the coating composition) and the oil in the coating composition. The resultant mixture is then stirred to co-coagulate the fluoropolymer and oil. The fluoropolymer is granulated to form aggregated granules having an average particle diameter of 1 to 200 µm by stirring the mixture, for example, for 10 to 60 minutes at a stirring speed of 100 to 500 rpm. Granulation is followed by the steps of separation, washing, and drying to result in powder in which the voids in the powder primary particles of fluoropolymer are filled with the oil. Thereby a composite powder of the fluoropolymer and oil in which the oil is uniformly present in the powder can be prepared. Large, coarse particles with particle diameters of at least 200 µm generated by the processes of coagulation and granulation can be crushed into fine particles as necessary.

In one embodiment, to chemically coagulate the primary particles of the fluoropolymer in an aqueous dispersion, an electrolytic material such as HCl, $H_2SO_4$, $HNO_3$, $H_3PO_4$, $Na_2SO_4$, $MgCl_2$, $CaCl_2$, HCOONa, $CH_3COOK$, and $(NH_4)_2CO_3$ is used. In a further embodiment, an organic solvent incompatible with water (preferably a fluorine-based solvent) is added to the aqueous dispersion as necessary so as to uniformly granulate the coagulated particles.

Other

Optionally, a variety of organic and inorganic fillers can be added to the present coating composition, based on the characteristics required thereof. Example organic fillers include engineering plastics, such as polyarylene sulfides, polyether ether ketones, polyamides, and polyimides. Example inorganic fillers include metal powders, metal oxides (e.g., aluminum oxide, zinc oxide, tin oxide, titanium oxide, and the like), glass, ceramics, silicon carbides, silicon oxides, calcium fluorides, carbon black, graphites, micas, and barium sulfates. Fillers having a variety of shapes, such as spherical particle shaped, fiber shaped, and flaked shaped fillers, can be used as the filler.

As was described above, wear resistance is enhanced by the presence of oil in the coating composition according to an embodiment of the present invention, and wear resistance is further enhanced by the addition of filler. Examples of particularly preferable fillers include, but are not limited to, silicon carbides (SiC), silicas, and polyimides (PI).

The amount of the filler to be blended depends on the type of filler that is used, in one embodiment filler is blended in an amount such that the filler is in a range from 0.1 to 10 wt. % based on the coating solids content (the entire solids content remaining as the coating film excluding the oil, that is, an amount with respect to the total amount of the fluoropolymer and the filler) of the coating composition. When the amount of filler to be blended is less than this range, the enhancement of wear resistance by the blended filler becomes meager, and on the other hand, when the amount exceeds this range, releasability is lower than when the amount is in this range.

When the coating composition is a liquid coating such as a water-based coating, the filler is preferably dispersed in a liquid medium such as water and then mixed with the coating composition. When the coating composition is a powder coating, a method such as dry blending that mixes the coating composition powder and the filler directly, or a co-aggregation method where a filler is added to an aqueous dispersion and then stirred and aggregated together can be used.

Coating Method

When the coating composition according to an embodiment of the present invention is a liquid (water or solvent-based) coating composition, the coating composition can be coated on a substrate by known liquid coating methods such as spray coating or dip coating. When the coating composition of the present invention is a powder coating composition, the coating composition can be coated on a substrate by known powder coating methods such as electrostatic coating.

In one embodiment, after application of a coating composition, a present coating film is formed by subjecting the applied coating composition to a heat treatment step at or above the melting point of the fluoropolymer. This results in melting of the fluoropolymer in the applied coating composition causing it to flow and thus form an even and defect and pin hole free coating film.

Examples of substrates subject to being coated with the present coating composition include, but are not limited to, substrates that can withstand heat treating, such as aluminum, iron, stainless steel, and other such metal substrates, glass, ceramic, and heat resistant plastic substrates.

Since the present coating composition exhibits excellent durability of the formed coating film and is thus capable of maintaining non-adhesiveness and releasability over a long period of time, the composition is particularly preferably used as a top coating (overcoat) for covering the molding surfaces of a mold.

While the thickness of the coating film of a top coating may be appropriately selected based on the application and the part to which the film will be applied, coating so as to create a film thickness after a heating treatment of at least 5 µm, and preferably at least 10 µm, is preferred. When the thickness is less than this, continuous film formation may become difficult, causing defects in the coating film and leaving the coating film prone to rapid loss of performance (non-adhesiveness, water and oil repellency) due to wear.

In one embodiment, the present coating composition is used in an outermost surface layer as a top coating, and can be applied to a surface of a substrate using an above-described method.

The present coating composition can be applied directly to a substrate surface, but surface adhesiveness may be increased by first applying a surface chemical treatment or primer coating to the substrate. A variety of engineering plastic polymers (for example, polyimides, polyamides, polyamide imides, polyether imides, polyarylene sulfides, and polyether ether ketones) that are highly adhesive with respect to various substrates are can be included as primer coatings prior to coating with a present coating composition. Furthermore, in one embodiment, fluoropolymer such as PFA is included in the primer coating to enhance interlayer adhesiveness between the substrate and the present coating film produced from the present coating composition. To make adhesion to both the present coating film and the substrate satisfactory, the percentage of the fluoropolymer in the primer coating is from 50 to 90 mass %, and the percentage of the engineering plastic polymer and the filler in the primer is from 10 to 50 mass %.

Coating Film

Coating films obtained using the present coating composition have a high degree of non-adhesiveness and water and oil repellency, and it is preferable that the coating film contact angle be at least 58 degrees, and more preferably at least 60 degrees.

In one embodiment, to enable the coating film to exhibit non-adhesiveness (releasability) for a long period of time of sustained use, the oil is included in the coating film at an amount from 1 to 35 wt. %, and preferably from 5 to 20 wt. % of the coating film.

The film thickness of a present coating film formed using a present coating composition can be appropriately selected based on the application and the substrate to which the film is to be applied. In the case where the coating film is used on a molding surface to enhance the releasability of a mold, the coating composition is preferably applied to the molding surface such that the film thickness after a heating and melting treatment is at least 5 μm, and is particularly preferably in a range from 5 to 300 μm. In the case where the film thickness is thinner than the above-described range, continuous coating film formation may be impossible, causing more coating film defects than when the thickness is in the above-described range, and the coating film may also rapidly lose performance (non-adhesiveness (releasability) and water and oil repellency) due to wear. On the other hand, economic efficiency is lost when the film thickness is thicker than the above-described range.

EXAMPLES

Measurement of Physical Properties
Decomposition Temperature of Oil

The temperature of approximately 50 mg of oil was raised 10° C. per minute from room temperature to 600° C. in a nitrogen atmosphere using a thermogravimetric analyzing device (TGA2050: available from TA Instruments, Inc.), and a temperature calculated by the method disclosed in JIS K7120 from an obtained temperature-weight curve was used as the decomposition temperature.

Melting Point of the Fluoropolymer

A temperature corresponding to the melting peak measured using a differential scanning calorimeter (Pyrisl Type DSC, available from PerkinElmer, Inc.) in accordance with ASTMD 3307 was used as the melting point.

State of Dispersion of Oil Particles in Coating (Visual Observation)

The coating was checked visually, and the state of dispersion of the oil was confirmed. The judgment criteria are as described below.

Favorable dispersion: The oil is well dispersed, and no two-layer separation due to sedimentation can be confirmed visually within 30 minutes after stirring.

Inferior dispersion: The startup of two-layer separation due to sedimentation within 30 minutes after stirring can be confirmed visually.

Average Particle Diameter of Oil Particles in Coating

Droplets of coating composition were added dropwise onto a glass slide (76×26 mm Micro slide glass, 1 to 1.2 mm thick, available from Matsunami) using a dropper, and the slide was placed on an aluminum substrate (50 mm×100 mm, 1 mm thick) and then observed using a reflection mode of an optical microscope (KH-1300, available from Hirox, Inc.). The oil particles were observed using photographs taken at magnifying powers from 2000 to 2500. An average value derived from a sample size of n=20 was used as an average particle diameter.

Coating Evaluation
State of Coating Formation (Visual Observation)

An obtained coating film was observed visually to confirm the state thereof. The judgment criteria are as described below.

Favorable: No unevenness or defects in the coating film.

Defects present: Defects are present in the coating film. (Part of the substrate surface is exposed)

Unevenness present: there are no defects (exposure of the substrate surface) in the coating film, but the film is not flat, and unevenness and undulations are visible.

Releasability (n-Hexadecane Contact Angle)

The contact angle (droplet size: approximately 2 μL) of n-hexadecane was measured using a fully automatic contact angle meter (Kyowa Interface Science Co., Ltd., DM-701) in a measurement environment of 25° C., and humidity of 60% RH.

Tape Peel Test

Adhesive tape (Scotch 898, available from 3M, width: 1.8 cm) cut to a length of 18 cm was affixed from a location of 5 cm from an end of an aluminum substrate (17 cm×17 cm, thickness of 2 mm) coated by a method described below (12 cm of tape was adhered on the above-described substrate), the adhesion surface was pressure bonded with a MONO (trade name) eraser (available from Tombow Pencil Co., Ltd.) to eliminate air bubbles, and then cured for 20 minutes. The tape (length of 6 cm) protruding from the aluminum substrate was folded back in half, and was used as a grip margin (length of 3 cm) for a fixing a chuck used in a tensile test.

The part of the above-described protruding tape that was folded back and the part at which the tape was not affixed to the aluminum substrate at the opposite side were fixed by a chuck, measurements were taken at a tensile rate of 20 mm/min using a tensile tester (Tensilon RTC-1310A available from Orientec), the stress (maximum value) when peeling the tape was determined, and the average value of five samples was used as the tape peel strength.

Soy Sauce Sugar Test

A first aluminum sheet (50 mm×100 mm, 1 mm thick) was coated with primer (as described subsequently in this document under the heading Coating Process (1) and (2)) and then coated with an example coating film produced from an example coating composition. A second aluminum sheet (50 mm×100 mm, 1 mm thick) was uncoated. A soy sauce and sugar blend (soy sauce to sugar ratio=50:50) test mixture was produced. The soy sauce and sugar blend was applied as a coating on the face of each of the first and second aluminum sheets, the coated area measuring 50 mm by 50 mm and beginning at one end of each of the first and second aluminum sheets. The first and second aluminum sheets were then formed into a laminate by bringing the two sheets into face to face contact so that the soy sauce and sugar blend coated area of each of the sheets coincided and was in intimate contact. The layered form of the laminate was then secured in two places using clips. Next, the laminate was heat treated in an oven for 30 minutes at 120° C., and then for 30 minutes at 200° C., and were then cooled to room temperature. The peel adhesion strength of the laminate at the region of face to face contact was measured using a tensile tester (Tensilon RTC-1310A, available from Orientec). The tensile tester was attached at each end of the aluminum sheets forming the laminate, more specifically each end opposite from the area of the laminate in face to face contact, and the pulling force applied to the laminate, peeling the laminate along the plane of face to face contact (a 0 degree peel test), at a tensile rate of 20 mm/min., and an average value was derived from five samples.

Measurement of Oil Residue Amount in Coating Film

An approximately 30 mg sample of the coating film was collected using scissors, and then, in the same manner as the measurement of the decomposition temperature of the oil, the temperature of the sample was raised 10° C. per minute from room temperature up to 600° C. in a nitrogen atmosphere using a thermogravimetric analyzing device (TGA2050, available from TA Instruments, Inc.). Since the decomposition temperature of the fluoropolymer in the coating film was higher than the decomposition temperature of the oil, the change in weight was measured in a range from the oil decomposition start temperature to the decomposition completed temperature, and this change was then used to derive the residual amount of oil in the coating film.

Coating Wear Resistance Test

Loss due to wear was measured in accordance with JIS K5600-5-10 (test piece reciprocating method) using an NUS-ISO3 Suga Wear Testing Machine available from Suga Test Instruments Co., Ltd. The test conditions were as described below.

Load: 1 N

Number of reciprocations: 100

Abrasive paper used: Silicon carbide paper, P-400 grade

Coating Process

A coating film for use in performance evaluation was produced by the following procedure.

(1) Substrate Surface Treatment (Coating Film Cleaning)

The surface of an aluminum substrate (JIS A1050 compliant material, 95 mm×150 mm, 1 mm thick) was degreased using isopropyl alcohol, and then, a sandblaster (Numablaster SGF-4(A) S-E566, available from Fuji Manufacturing Co., Ltd.) was used to subject the surface to roughening by shot blasting using #60 alumina (Showa Blaster, available from Showa Denko KK).

(2) Undercoating (Primer Application)

Using an air spray coating gun (W-88-10E2 φ1 mm nozzle (manual gun)) available from Anest Iwata Corporation), a liquid primer coating PJ-YL902 (available from Chemours-Mitsui Fluoroproducts Co., Ltd.) was sprayed at an air pressure of 2.5 to 3.0 kgf/cm² onto the substrate treated as describe in (1) above. Coating was done so that a coated liquid mass was approximately 0.2 g (0.15 to 0.25 g) per sheet of substrate, and then drying was performed in a forced draft circulation furnace at 120° C. for 15 minutes to form a coating film with a film thickness of 6 to 8 μm. The coating environment was 25° C. at a humidity of 60% RH (relative humidity).

(3) Coating Formation by Overcoating

Using an air spray coating gun (W-88-10E2 φ1 mm nozzle (manual gun) available from Anest Iwata Corporation), a present liquid coating composition of an example to be described later was sprayed at an air pressure of 2.5 to 3.0 kgf/cm² onto the substrate treated as described in (1) and (2) above. Coating was done so that the coated liquid mass was approximately 0.2 g (0.15 to 0.25 g) per sheet of substrate, and then, drying was performed in a forced draft circulation furnace at 120° C. for 15 minutes followed by a further heat treatment at 340° C. for 30 minutes to form a coating film with a film thickness of 8 to 10 μm. The coating environment was 25° C. at a humidity of 60% RH.

Example 1

A polymer beaker was filled with 3.68 g of silicone oil (KF-54 with a decomposition temperature of 393° C., available from Shin-Etsu Chemical Co., Ltd.) as the oil, and 14.74 g of a silicone-based surfactant (KF-352A, available from Shin-Etsu Chemical Co., Ltd., aqueous solution with concentration of 20 wt. %), and an ultrasonic dispersion treatment was performed for five minutes using an ultrasonic generator (Ultrasonic MINIWELDER HS3-4, available from Ultrasonic Engineering Co., Ltd.). To this was added 181.97 g of perfluoroalkoxy polymer (PFA) aqueous dispersion EJ-CL500 (average particle diameter of included PFA: approximately 0.2 μm, melting point: 309° C., PFA polymer solids content: 37 wt. %), which is a fluoropolymer waterbased coating for top coating available from Chemours-Mitsui Fluoroproducts Co., Ltd., and then, the contents were stirred for 15 minutes at 480 rpm using a down flow propeller type 4-bladed stirrer to obtain a fluoropolymer coating composition. The obtained coating composition was applied onto an aluminum substrate which had been subjected to a primer treatment using the method described above, and a coating film sample was thereby produced. (Content of silicone oil per the total amount of the polymer solids content (fluoropolymer) and silicone oil of the fluoropolymer coating composition: 5.0 wt. %.)

The composition of the fluoropolymer coating composition, the process, and the state are shown in Table 1, and the evaluation results for the coating film samples are shown in Table 2.

Example 2

A coating composition was prepared and a coating film sample was produced in the same manner as in Example 1 with the exception that the amount of the silicone oil was 7.78 g and the amount of the silicone-based surfactant was 31.11 g. (Content of silicone oil per the total amount of the polymer solids content (fluoropolymer) and silicone oil of the fluoropolymer coating composition: 10.0 wt. %.)

The composition of the fluoropolymer coating composition, the process, and the state are shown in Table 1, and the evaluation results for the coating film samples are shown in Table 2.

Example 3

A coating composition was prepared and a coating film sample was produced in the same manner as in Example 1 with the exception that the amount of the silicone oil was 1.07 g and the amount of the silicone-based surfactant was 4.26 g. (Content of silicone oil per the total amount of the polymer solids content (fluoropolymer) and silicone oil of the fluoropolymer coating composition: 1.5 wt. %.)

The composition of the fluoropolymer coating composition, the process, and the state are shown in Table 1, and the evaluation results for the coating film samples are shown in Table 2.

Example 4

A coating composition was prepared and a coating film sample was produced in the same manner as in Example 1 with the exception that the amount of the silicone oil was 30.0 g and the amount of the silicone-based surfactant was 119.99 g. (Content of silicone oil per the total amount of the polymer solids content (fluoropolymer) and silicone oil of the fluoropolymer coating composition: 30.0 wt. %.)

The composition of the fluoropolymer coating composition, the process, and the state are shown in Table 1, and the evaluation results for the coating film samples are shown in Table 2.

Reference Example 1

Into a 1 liter stainless steel beaker, 35.6 g of a fluorine-based solvent (Vertrel (trade name) Suprion, available from Chemours-Mitsui Fluoroproducts Co., Ltd.), 8.89 g of PFPE (decomposition temperature: 426° C.) as a fluoro oil, and 4.99 g of a fluorochemical surfactant (Capstone (trade name) FS-31 (nonionic type fluorochemical surfactant 25% aqueous solution), available from Chemours Company) were inserted, and then stirred for five minutes at 480 rpm using a down flow propeller type 4-bladed stirrer. Then, 200 g of perfluoroalkoxy polymer (PFA) aqueous dispersion EJ-CL500 (average particle diameter of included PFA: approximately 0.2 μm, melting point: 309° C., PFA polymer solids content: 37 wt. %), which is a fluoropolymer water-based coating for top coating available from Chemours-Mitsui Fluoroproducts Co., Ltd., was added, and the contents were stirred for an additional 15 minutes. The above blend was heated in a water bath at approximately 70° C. for 1 hour while being stirred to volatilize the fluorine-based solvent, and thereby a fluoropolymer coating composition was obtained.

The obtained coating composition was applied onto an aluminum substrate which had been subjected to a primer treatment using the method described above, and thereby a coating film sample was produced. (Content of fluoro oil per the total amount of the polymer solids content (fluoropolymer) and fluoro oil of the fluoropolymer coating composition: 10.7 wt. %.)

The composition of the fluoropolymer coating composition, the process, and the state are shown in Table 1, and the evaluation results for the coating film samples are shown in Table 2.

Reference Example 2

A coating composition was prepared and a coating film sample was produced in the same manner as in Reference Example 1 with the exception that the amount of the fluorine-based solvent was 80 g, the amount of the fluoro oil was 20 g, and the amount of the fluorochemical surfactant was 6.12 g. (Content of fluoro oil per the total amount of the polymer solids content (fluoropolymer) and fluoro oil of the fluoropolymer coating composition: 21.3 wt. %.)

The composition of the fluoropolymer coating composition, the process, and the state are shown in Table 1, and the evaluation results for the coating film samples are shown in Table 2.

Reference Example 3

Into a 1-liter stainless steel beaker, 8.22 g of PFPE (decomposition temperature: 426° C.) as fluoro oil, and 16.44 g of a fluorochemical surfactant (Capstone (trade name) FS-31 (nonionic type fluorochemical surfactant 25% aqueous solution)), available from Chemours Company) were inserted, and then subjected to an ultrasonic dispersion treatment for five minutes using an ultrasonic generator (UE-100Z28S-8A Ultrasonic Generator, available from Ultrasonic Engineering Co., Ltd.). To this was added 200 g of perfluoroalkoxy polymer (PFA) aqueous dispersion EJ-CL500 (average particle diameter of included PFA: approximately 0.2 μm, melting point: 309° C., PFA polymer solids content: 37 wt. %), which is a fluoropolymer water-based coating for top coating available from Chemours-Mitsui Fluoroproducts Co., Ltd., and then the contents were stirred for 15 minutes at 480 rpm using a down flow propeller type 4-bladed stirrer to obtain a fluoropolymer coating composition.

The obtained coating composition was applied onto an aluminum substrate which had been subjected to a primer treatment using the method described above, and a coating film sample was thereby produced. (Content of fluoro oil per the total amount of the polymer solids content (fluoropolymer) and fluoro oil of the fluoropolymer coating composition: 10.0 wt. %.)

The composition of the fluoropolymer coating composition, the process, and the state are shown in Table 1, and the evaluation results for the coating film samples are shown in Table 2.

Comparative Example 1

The fluoropolymer (PFA) water-based coating for top coating (EJ-CL500, PFA average particle diameter: approximately 0.2 μm, melting point (based on ASTM D 3307): 309° C., available from Chemours-Mitsui Fluoroproducts Co., Ltd.), which was used in Example 1, was used to coat a substrate that had been subjected to a primer treatment using the above-described method, and a coating film sample was thereby produced.

The composition of the fluoropolymer coating composition, the process, and the state are shown in Table 1, and the evaluation results for the coating film samples are shown in Table 2.

Comparative Example 2

As the oil, 8.89 g of 2-perfluorohexyl-ethyl methacrylate (PHEM) having a decomposition temperature of 111° C., and 200 g of perfluoroalkoxy polymer (PFA) aqueous dispersion EJ-CL500 (average particle diameter of included PFA: approximately 0.2 μm, melting point: 309° C., PFA polymer solids content: 37 wt. %), which is a fluoropolymer water-based coating for top coating available from Chemours-Mitsui Fluoroproducts Co., Ltd., were inserted into a 1 liter stainless steel beaker, and then stirred for 15 minutes at 480 rpm using a down flow propeller type 4-bladed stirrer. The obtained coating composition was applied onto an aluminum substrate which had been subjected to a primer treatment using the method described above, and a coating film sample was thereby produced. (Content of PHEM per the total amount of the polymer solids content (fluoropolymer) and PHEM of the fluoropolymer coating composition: 10.7 wt. %.)

The composition of the fluoropolymer coating composition, the process, and the state are shown in Table 1, and the evaluation results for the coating film samples are shown in Table 2.

Comparative Example 3

A coating composition was prepared and a coating film sample was produced in the same manner as in Reference Example 1 with the exception that as the oil, a PFPE composition (Nikkol NET-HC-04, PFPE 65 wt. %, available from Nikko Chemicals Co., Ltd.) containing PFPE having a decomposition temperature of 227° C. was used, and 13.68 g (8.89 g of fluoro oil) of the PFPE composition was added. (Content of fluoro oil per the total amount of the polymer solids content (fluoropolymer) and fluoro oil of the fluoropolymer coating composition: 10.7 wt. %.)

The composition of the fluoropolymer coating composition, the process, and the state are shown in Table 1, and the evaluation results for the coating film samples are shown in Table 2.

TABLE 1

| | Oil | | Coating composition, adjustment process | | | | | |
|---|---|---|---|---|---|---|---|---|
| | Product name | Oil decomposition temperature | Use of surfactant | Oil dilution | Ultrasonic dispersion | Oil concentration in coating | Oil dispersion state in coating | Oil droplet particle diameter (μm) |
| Example 1 | silicone oil KF54 | 393° C. | Si surfactant | N | Y | 5.0% | Favorable dispersion | — |
| Example 2 | | | N | N | Y | 10.0% | Favorable dispersion | 7.7 ± 2.9 |
| Example 3 | | | N | N | Y | 1.5% | Favorable dispersion | — |
| Example 4 | | | N | N | Y | 30.0% | Favorable dispersion | — |
| Reference Example 1 | PFPE | 426° C. | Y | Y | N | 10.7% | Favorable dispersion | 8.4 ± 6.6 |
| Reference Example 2 | | | Y | Y | N | 21.3% | Favorable dispersion | — |
| Reference Example 3 | | | Y | N | Y | 10.0% | Favorable dispersion | 5.92 ± 3.3 |
| Comparative Example 1 | Not added | — | — | — | — | — | — | — |
| Comparative Example 2 | 2-perfluorohexyl-ethyl methacrylate | 111° C. | N | N | N | 10.7% | Favorable dispersion | — |
| Comparative Example 3 | PFPE | 227° C. | Y | Y | N | 10.7% | Favorable dispersion | — |

TABLE 2

| | Coating film performance | | | | | |
|---|---|---|---|---|---|---|
| | Coating formation state | Oil residue amount in coating film (wt. %) | n-hexadecane contact angle (°) | Tape peel test (kgf) | Sugar soy sauce (whole surface application) (kgf) | Wear resistance Amount of wear (mg) after 100 reciprocations with a 1N load |
| Example 1 | Favorable | 3.6% | 58.9 | 31.8 | 1.8 | 1.6 |
| Example 2 | Favorable | 6.8% | 61.1 | 13.6 | 1.6 | 1.6 |
| Example 3 | Favorable | — | 61.9 | 33.6 | — | — |
| Example 4 | Favorable | — | 60 | 18.4 | — | — |
| Reference Example 1 | Favorable | 6.5% | 71.5 | 11.9 | 0 | — |
| Reference Example 2 | Favorable | 11.0% | 70.8 | 9.2 | 0 | — |
| Reference Example 3 | Favorable | 7.0% | 73.1 | 11.5 | | 2 |
| Comparative Example 1 | Favorable | — | 56.4 | 40.8 | 14.3 | 5.1 |
| Comparative Example 2 | Favorable | Undetectable | 55.7 | — | — | — |
| Comparative Example 3 | Favorable | Undetectable | 55.3 | — | — | — |

As is clear from Tables 1 and 2, with the coating films of Examples 1 and 2 for which the silicone oil is dispersed, the oil exudes to the surface of the coating films as is clear from the results of the tape peel tests, and wear resistance of nearly the same level as that of Reference Examples 1 to 3, which were obtained by blending fluoro oil, is obtained. In addition, releasability is improved in comparison to that of Comparative Examples 1 to 3.

INDUSTRIAL APPLICABILITY

The coating composition according to the present invention is capable of forming coating films that can exhibit excellent non-adhesiveness (releasability) and water and oil repellency over a long period of time, and also excels in wear resistance, and can thus be appropriately used in the formation of top coating layers for enhancing the releasability of forming molds, and can appropriately be used as a top coating layer for cookware such as frying pans and rice cookers; heat resistant releasable trays (in bread making processes and the like) in production lines, and the like; equipment such as fixing rolls, belts and inkjet nozzles; coatings for sliding members such as seal rings and bearings; and piping and other such goods related to industrial equipment.

What is claimed is:

1. A fluoropolymer coating composition comprising:
   a fluoropolymer; and
   an oil that is a liquid at 25° C., wherein
   the decomposition temperature of said oil is higher than the melting point of said fluoropolymer, and wherein said oil is essentially free from fluorine and is dispersed in said fluoropolymer coating composition with an average particle diameter of 50 µm or less.

2. The fluoropolymer coating composition according to claim 1, wherein said oil is contained in an amount from 1 to 35 wt. % of a total amount of polymer solids content and said oil in said coating composition.

3. The fluoropolymer coating composition according to claim 1, wherein said decomposition temperature of said oil is at least 10° C. higher than said melting point of said fluoropolymer.

4. The fluoropolymer coating composition according to claim 1, wherein said oil is silicone oil.

5. The fluoropolymer coating composition according to claim 1, further comprising a surfactant.

6. The fluoropolymer coating composition according to claim 1, wherein said fluoropolymer comprises melt-processable perfluoropolymer.

7. The fluoropolymer coating composition according to claim 1, wherein said fluoropolymer comprises tetrafluoroethylene-perfluoro(alkyl vinyl ether) copolymer (PFA) wherein the alkyl group of the perfluoro(alkyl vinyl ether) has 1 to 5 carbon atoms.

8. The fluoropolymer coating composition according to claim 1, wherein said fluoropolymer coating composition is a water-based coating or a powder coating.

9. The fluoropolymer coating composition according to claim 1, wherein said coating composition is a top coating.

10. A coating film forming method comprising applying said fluoropolymer coating composition according to claim 1, and then heat treating the coated composition to a temperature of at least said melting point of said fluoropolymer.

11. A mold, wherein said coating film according to claim 10 is formed on a molding surface of said mold.

* * * * *